(12) United States Patent
Yin

(10) Patent No.: US 12,036,484 B2
(45) Date of Patent: Jul. 16, 2024

(54) POWDER EXTRACTOR

(71) Applicant: MYANDE GROUP CO., LTD., Yangzhou (CN)

(72) Inventor: Yuefeng Yin, Yangzhou (CN)

(73) Assignee: MYANDE GROUP CO., LTD., Yangzhou (CN)

(*) Notice: Subject to any disclaimer, the term of this patent is extended or adjusted under 35 U.S.C. 154(b) by 646 days.

(21) Appl. No.: 17/276,795

(22) PCT Filed: Mar. 10, 2020

(86) PCT No.: PCT/CN2020/078567
§ 371 (c)(1),
(2) Date: Mar. 16, 2021

(87) PCT Pub. No.: WO2020/199859
PCT Pub. Date: Oct. 8, 2020

(65) Prior Publication Data
US 2021/0354048 A1    Nov. 18, 2021

(30) Foreign Application Priority Data
Apr. 3, 2019   (CN) .......................... 201910264773.3

(51) Int. Cl.
*B01D 11/02*   (2006.01)
(52) U.S. Cl.
CPC ................. *B01D 11/0226* (2013.01)
(58) Field of Classification Search
CPC ..... B01D 11/00; B01D 11/02; B01D 11/0215; B01D 11/0223; B01D 11/0226; B01D 11/023; B01D 11/028; B01D 11/0284
See application file for complete search history.

(56) References Cited

U.S. PATENT DOCUMENTS

| | | | |
|---|---|---|---|
| 3,607,104 A * | 9/1971 | Blickle | B01J 8/18 422/231 |
| 2015/0068969 A1* | 3/2015 | Stagg | B01D 21/003 210/322 |

FOREIGN PATENT DOCUMENTS

| | | |
|---|---|---|
| CN | 2690023 Y | 4/2005 |
| CN | 2703571 Y | 6/2005 |
| CN | 107261552 A | 10/2017 |

(Continued)

OTHER PUBLICATIONS

Machine translation of CN 107261552 A, which was published on Oct. 20, 2017 and provided in the IDS filed on Mar. 16, 2021. (Year: 2017).*

*Primary Examiner* — Natasha E Young
(74) *Attorney, Agent, or Firm* — Cheng-Ju Chiang

(57) ABSTRACT

A powder extractor. Multiple tank partitions are connected between the front and rear wall panels of a rectangular box. Each tank partition divides the inner cavity of the tank into a plurality of soaking tanks. The upper part of each tank partition is respectively provided There are overflow ports. The overflow ports on the partitions of adjacent tanks are staggered in the front and rear directions, and the height of each overflow port gradually decreases from right to left. The discharge end of the rightmost soaking tank relates to a new melt inlet, the feed end of the leftmost soaking tank relates to a concentrated liquid outlet; the leftmost soaking tank is provided with a feed inlet above the feed end. The powder extractor has high soaking efficiency, reduces powder waste, and improves economic benefits.

10 Claims, 13 Drawing Sheets

(56) References Cited

FOREIGN PATENT DOCUMENTS

| | | | |
|---|---|---|---|
| CN | 207193205 | U | 4/2018 |
| CN | 208541833 | U | 2/2019 |
| CN | 109833643 | A | 6/2019 |
| CN | 109833644 | A | 6/2019 |
| CN | 109833645 | A | 6/2019 |
| CN | 109833646 | A | 6/2019 |
| CN | 109836472 | A | 6/2019 |
| CN | 110074251 | A | 8/2019 |
| CN | 209790932 | U | 12/2019 |
| CN | 209790934 | U | 12/2019 |
| CN | 210021239 | U | 2/2020 |
| WO | 01/17642 | A2 | 3/2001 |

\* cited by examiner

POWDER EXTRACTOR

CROSS REFERENCE TO RELATED APPLICATIONS

The present application is a 35 U.S.C. § 371 National Phase conversion of International (PCT) Patent Application No. PCT/CN2020/078567, now WO 2020/199859, filed on Mar. 10, 2020, which claims priority of Chinese Patent Application No. 201910264773.3, filed on Apr. 3, 2019, the disclosure of which is incorporated by reference herein. The PCT International Patent Application was filed and published in Chinese.

BACKGROUND

1. Technical Field

The invention relates to the field of technology of extraction equipment, to a kind of powder extractor, which is used to many kinds of industry, such as food, environmental protection, and chemical industry etc.

2. Description of Related Art

There are kinds of extraction equipment at the market, such as the extraction equipment of fixed bed, the extraction equipment of moved bed, the extraction equipment of basket bucket, the extraction equipment of filter cartridge. The general principle is that the solid is naturally accumulated into a stable material bed or forced to form a stable material bed, the extraction liquid or washing liquid is poured from the top of the stable material bed, and the liquid penetrates the material layer to complete the mass transfer process.

The above type of equipment has requirements on the particle size of solid materials, solid materials should be in bulk or flake form. There is a certain gap between the particles after accumulation to facilitate the extraction liquid or washing liquid penetration. When the powder in the solid material is too large, the void fraction of the material bed is insufficient, and the permeability rate will decrease or not permeate, such as the leaching of tea seed cake, brown kernel cake and other materials.

In addition, the physical and chemical properties of solid and liquid are required. Some solid components and liquid components are inter-soluble, forming viscous substance, blocking filter or grid plate, resulting in the decrease of effect of extraction or washing process or not sustainable extraction or washing process, so the above type of extraction equipment must be regularly cleaned and maintained, such as soybean protein concentrate leaching.

White bean chips or low denatured bulking material, which is the processing raw material of soybean protein concentrate, contains 8-10% of high powder degree debris, which cannot be treated by conventional leaching process, and must be screened out as waste material, and the waste material is also treated which results in low economic return rate, poor sales, and occupying funds.

In the existing extractor, the contact between most solid materials and the extraction liquid is laminar flow contact, and the mixture with the extraction liquid is not sufficient during the process of working. The light phase is located at the upper part of the liquid layer, and the new solution is prone to short circuit, which leads to insufficient extracting power and low extracting efficiency. The extraction path seems to be long, but the utilization rate of the upper screen surface of each group of leaching units is exceptionally low.

In addition, the concentrated extract extracted by the powder extractor contains a lot of powder particles, and the concentrated extraction liquid flowing into the subsequent pipeline will lead to the blockage of the outlet pipe valve, so it must be filtered. The traditional filter used for a period can occur siltation and blockage, and the liquid flow can decrease, so the filter element needs to be replaced or cleaned, which can affect the continuous and stable operation of the production line.

SUMMARY

The objective of the present invention is to overcome the problems existing in the prior art and provide a powder extractor with high soaking efficiency, which can ensure that the liquid can penetrate the powdery materials, can meet the large-scale industrial production, reduce powdery waste material, and improve economy benefit.

In order to solve the above technical problems, a powder extractor of the present invention includes a rectangular box body, and a plurality of parallel tank partitions are connected between the front and rear wall panels of the box body, the internal cavity of the box body is divided into a plurality of immersion tank by each tank partition, the upper part of each tank partition is respectively provided with overflowing ports, the overflowing ports on the adjacent tank partitions are staggered in the front and rear directions, and the height of each overflowing port decreases from right to left, and the discharge end of the rightmost immersion tank is connected with a new dissolving inlet, the feed end of the leftmost immersion tank is connected with a concentrated liquid outlet; the leftmost immersion tank has a feed inlet above the feed end; The discharge end of each tank partition respectively installs a material guide groove for lifting and turning to the right, and a discharge groove is installed on the discharge end of the right wall panel of the box body.

Compared to existing technology, the beneficial effects of the present invention are that the material enters the feed end of the leftmost immersion tank from the feed inlet, and the new solvent enters the rightmost immersion tank. The soaking and extracting process is completed in the immersion tank. When the material is pushed to the discharge end of each immersion tank, it is picked up along the material guide groove. After leaving the liquid surface, it is drained briefly and falls into the lower-level immersion tank on the right. The advancing direction of the materials in the adjacent immersion tanks is opposite, so that the solid materials advance zigzag in an S-shaped. When the solid material enters the final immersion tank, it is fully immersed and mixed with the new solution, and then taken out from the discharge end of the rightmost immersion tank along the discharge groove and discharged out of the machine. The solid material and the solution always maintain the opposite flow, the material with the highest content is in contact with the concentrated solution, and the material with the lower content is in contact with the dilute solution, which can always maintain a good osmotic pressure, which further improves the mass transfer efficiency. The solid material horizontally advances alternately along the immersion tank, and after a period of horizontal advancement, it is taken out and dropped into the next vertical immersion tank, and it is repeatedly stirred to make the material and solution to be in a turbulent stat without laminar flow, even if the void fraction of the powder is small, the powder can also be fully saturated by the solution. Adjacent overflowing ports are staggered in the front and rear directions, and the solvent also flows zigzag in an S-shaped, and it is opposite to the forward direction of the solid material. The solvent flows through the full length of each immersion tank, and then uses the displacement to overflow to the next immersion tank and flow back through the full length of the immersion tank, which greatly extends the extraction stroke of the solid material and the solution, and can achieve full extraction, thereby achieving efficient extraction. The concentrated extract that reaches the leftmost immersion tank is discharged from the concentrated liquid outlet. The soaking liquid level is slightly higher than the solid phase, the solid-liquid mixing is sufficient, the solvent consumption is low, the concentration of the obtained mixed liquid is high, and the energy consumption of evaporation and separation is low.

As an improvement of the present invention, wherein the bottom of each immersion tank is arc-shaped and is equipped with immersion tank spirals, and the spiral directions of the adjacent immersion tanks are opposite; each of the material guide grooves is respectively installed with a scraper lifting mechanism, and the discharge groove is installed with a scraper discharging mechanism. The bottom of the immersion tank is arc-shaped and coincides with the immersion tank spiral, which can avoid dead space at the bottom of the tank; the immersion tank spiral is responsible for the transportation of solid materials in the immersion tank and completes the process of soaking and extracting. The forced stirring of the spiral blade avoids the defect of insufficient mass transfer between materials and solvents in the simple soaking process. The spiral directions of adjacent immersion tanks are opposite to make the materials advance in an S-shape. The scraper lifting mechanism is used to lift, drain, and transport the soaked solid materials for solid-liquid separation and solid phase lifting; the scraper discharging mechanism is used to lift, drain, and discharge the solid materials after extraction. The spiral plus scraper not only plays the role of conveying solid materials, but also strongly stirs the solid materials. The height of the material layer in the soaking box reaches 800 mm, which increases productivity by 50-80% higher than the traditional 350 mm material layer; the way that the extraction liquid is naturally permeated from top to bottom is changed to the way of spiral mechanical stirring, which can make solid-liquid directly mix and leach, and make extracting power large, and make the extracting efficiency high; the amount of solvent involved in the circulation of the traditional leaching system is 5 times that of the solid material. The volume ratio of solid-liquid is about 1.2-1.5 times, and the initial dosage is only quarter to one-third of the original amount, which greatly saves a lot of solvents and capital.

As an improvement of the present invention, wherein each immersion tank is provided with at least one baffle plate extending in the left and right direction, and the lower end of each baffle plate is respectively clamped above the immersion tank spiral through the concave arc of the baffle plate. The baffle plate can prevent the surface solution from not fully contacting with the solid material, that is short-circuiting out. The concave arc of the baffle plate stuck above the immersion tank spiral provides a channel for material transportation, and it forces the solution to pass from the gap of the concave arc of the baffle plate. Stirring and mixing between the solid material and the extracting liquid makes them fully contact, which further improves the infiltration effect of the material and the solution; the solid and the liquid are in turbulent contact under stirring, and the liquid phase has no chromatography, and the concentration of same phase is consistent. The multi-channel baffle plates make the solvent flow in an S-shaped by upward and downward directions in each immersion tank, which prevents the short circuit of the solvent, so the extracting power is significantly increased, and the extracting efficiency is high.

As an improvement of the present invention, wherein the discharge end of the spiral shaft of each immersion tank spiral is respectively equipped with a hollow large sprocket, the lower end of the lifting drive chain of the corresponding scraper lifting mechanism is engaged with the hollow large sprocket, and a plurality of lifting scrapers are evenly arranged on the lifting drive chain. Part of the material can enter the discharge end of the immersion tank through the hollow of the hollow large sprocket, so that the receiving area of the lifting scraper is enlarged, and the conveying capacity of the lifting scraper is increased. The immersion tank spiral and the scraper lifting mechanism rotate synchronously. The lifting scraper picks up and lifts the pushed material from the solution and then falls into the next immersion tank. The conveying capacity of the lifting scraper is greater than that of the immersion tank spiral, which can ensure that it does not cause blockage.

As an improvement of the present invention, wherein the upper end of each lifting drive chain is meshed with the small lifting sprocket, each small lifting sprocket is installed on the driving shaft, and each driving shaft is also equipped with a linkage sprocket, two adjacent driving shafts form a group and two linkage sprockets are connected by a linked chain; the shaft end of one of the driving shafts is equipped with a big lifting sprocket, and the big lifting sprocket is connected to the main sprocket of the drive reducer through the main chain. The main sprocket of the drive reducer drives the big lifting sprocket to rotate through the main chain, the big lifting sprocket drives the small lifting sprocket and the linkage sprocket through the driving shaft, and the linked chain drives the other driving shaft and the small lifting sprocket to rotate synchronously, two small lifting sprockets drive the lifting scraper to work and drive the immersion tank spiral to rotate through the lifting drive chain respectively, so that a drive reducer can simultaneously drive the two immersion tank spiral to push solid materials to the left and right, and simultaneously drive two scraper lifting mechanisms to synchronously catch, drain and lift solid materials.

As an improvement of the present invention, wherein the two ends of the spiral shaft of each immersion tank spiral are respectively supported in the spiral bearing seat, and each spiral bearing seat is respectively fixed at the center of the circular sealing plate, and each circular sealing plate covers and fixes on the outside of the spiral mounting holes at both ends of the immersion tank. Removing the circular sealing plate and the spiral bearing seat can extract the immersion tank spiral from the spiral mounting hole. When installing, first we can insert the immersion tank spiral to the spiral mounting hole, and then cover the circular sealing plate and fix it with bolts, finally install the spiral bearing seat and fix it.

As an improvement of the present invention, wherein the lower end of the discharging drive chain of the scraper discharging mechanism is engaged with the hollow large sprocket, and a plurality of discharging scrapers are evenly arranged on the discharging drive chain. Part of the material can enter the discharge end of the right-most immersion tank through the hollow part of the hollow large sprocket, which increases the receiving area of the discharging scraper and improves the conveying capacity of the discharging scraper. The immersion tank spiral and the scraper discharging mechanism rotate synchronously. The discharging scraper picks up the pushed material from the solution, lifts it and discharges it out of the powder extractor. The conveying capacity of the discharging scraper is greater than that of the immersion tank spiral to ensure that it does not cause blockage.

As an improvement of the present invention, wherein each immersion tank spiral includes a spiral shaft and a main spiral piece wound around the outer circumference of the spiral shaft, a filter cartridge is installed at the feed end of the spiral shaft below the feed inlet, the port on the side of the filter cartridge facing the main spiral piece is closed and the port on the other one side of it is open, the concentrated liquid outlet is inserted into the internal cavity of the filter cartridge, a plurality of grate bars extending in the axial direction are evenly distributed on the circumference of the filter cartridge, and the gap between adjacent grate bars is narrow outside and wide inside. Filtered by the filter cartridge before flowing out, the powder is trapped on the outer surface of the filter cartridge to reduce the content of powdery solids in the concentrated extract as much as possible to provide guarantee for the subsequent the spiral-liquid separation and evaporation; after the concentrated extract of the solid-liquid intermixed medium is continuously and stably filtered out, it enters the concentrated liquid outlet and flows out. The filtered concentrated extract can be stably and continuously filtered and transported without blocking the outlet pipe valve to enter the spiral-liquid separation system for fine filtration. Once the powder passes over the outermost gap of the filter cartridge, it can smoothly fall into the bottom of the filter cartridge and be pushed out by the filter cartridge inner spiral belt to clean, which avoids powder particles from getting stuck in the gap between adjacent grate bars and affecting the filtering capacity.

As an improvement of the present invention, wherein the outer circumference of the filter cartridge is wrapped with a filter cartridge outer spiral belt, and the rotating direction of the filter cartridge outer spiral belt is the same as the coaxial main spiral piece. The filter cartridge outer spiral belt can push the solid materials flowing with the liquid to the side of the main spiral piece, avoiding excessive material accumulation outside the filter cartridge.

As an improvement of the present invention, wherein the inner wall of the filter cartridge is provided with a filter cartridge inner spiral belt, and the rotating direction of the filter cartridge inner spiral belt is opposite to the coaxial main spiral piece. A small amount of solid powder will enter the filter cartridge with the extracted liquid and settle on bottom of the inner wall of the filter cartridge. The filter cartridge inner spiral belt pushes the sediment out of the filter cartridge from the open end, and then the sediment is pushed out the filtering section by the filter cartridge outer spiral belt to complete the self-cleaning process of the filter cartridge. So, realizing stable, reliable, and continuous filtration, improving the craft of the powder extractor, that solves the problem of separation of high-powder material and liquid, and makes the powder extractor have a wide range of adaptability to various oils.

BRIEF DESCRIPTION OF THE DRAWINGS

The present invention will be further described in detail below in conjunction with the drawings and specific embodiments. The drawings are only used to provide for reference and illustration and are not intended to limit the present invention.

Figure 1:
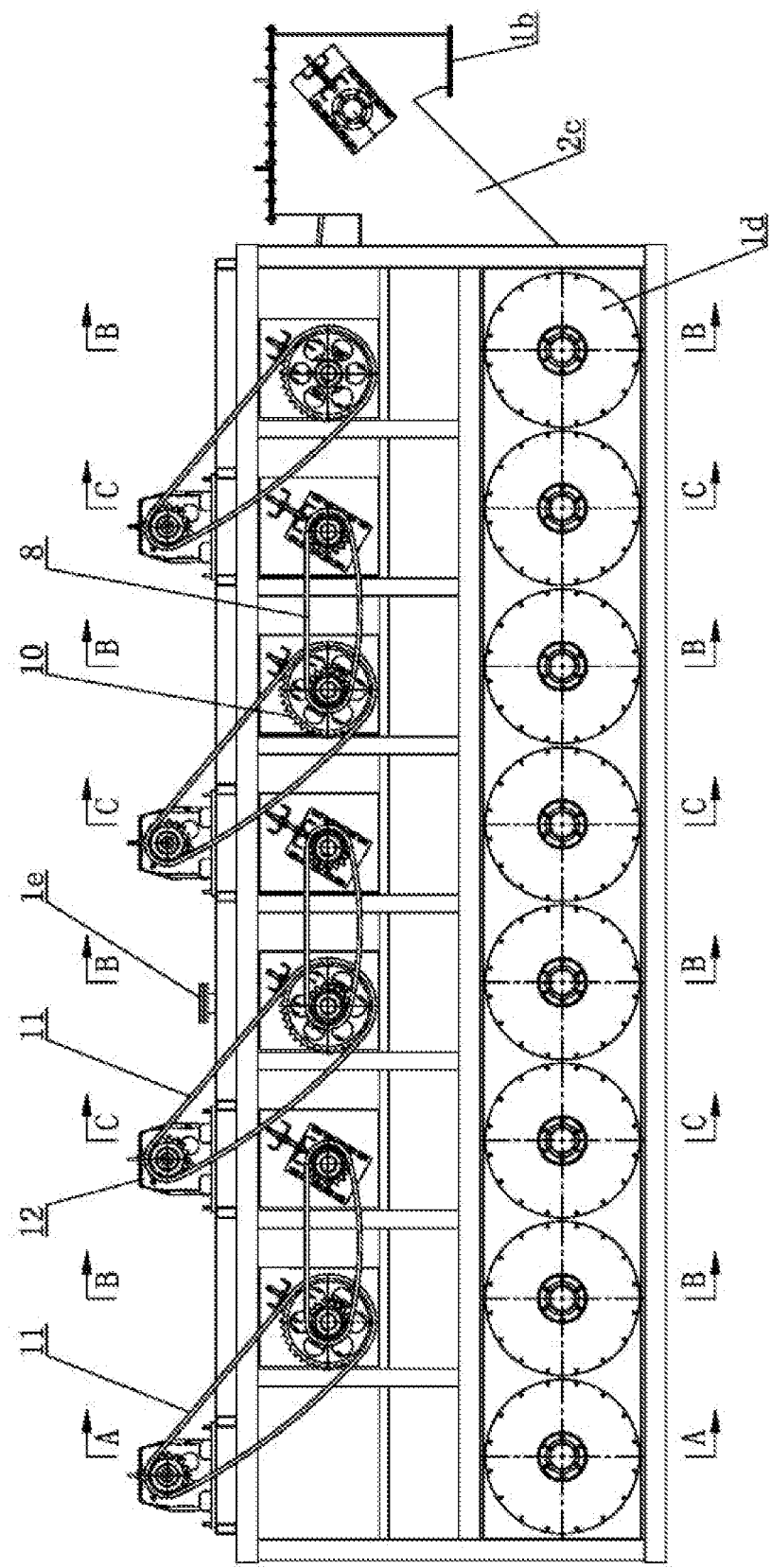
FIG. 1 is a front view of the first embodiment of the powder extractor of the present invention.
Figure 2:
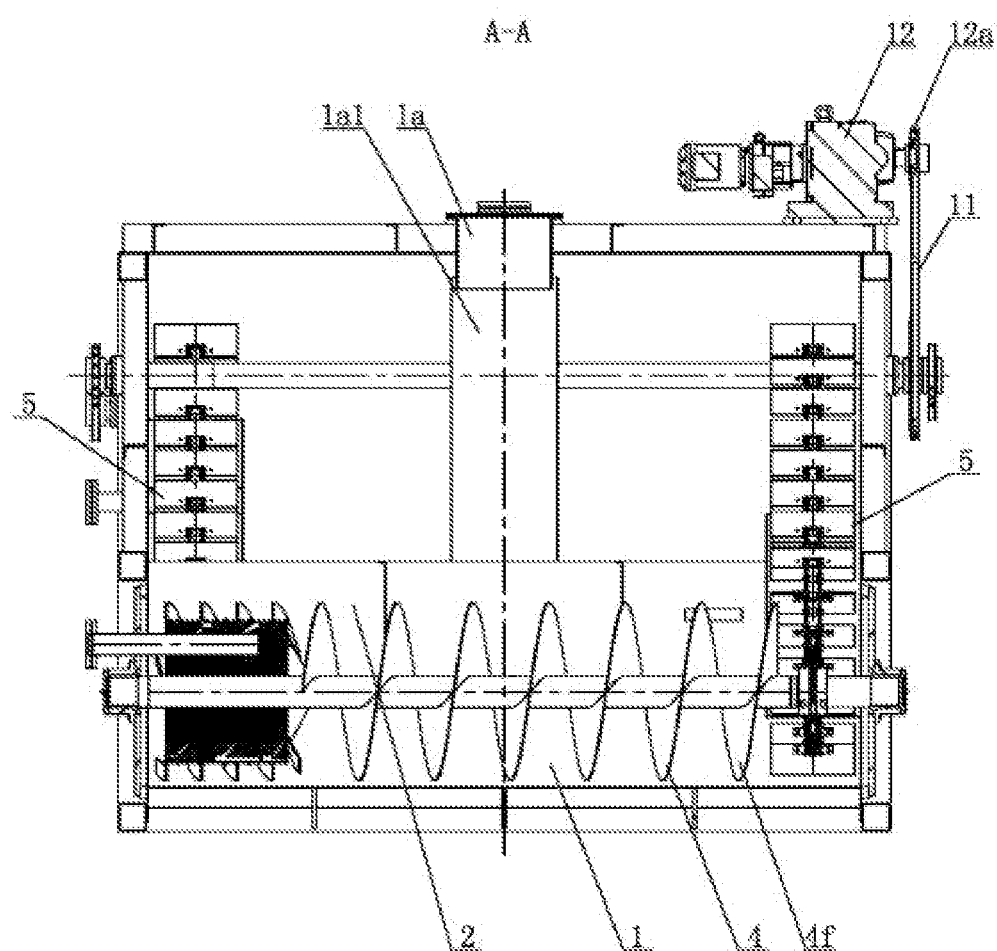
FIG. 2 is a cross-sectional view along A-A in FIG. 1.
Figure 3:
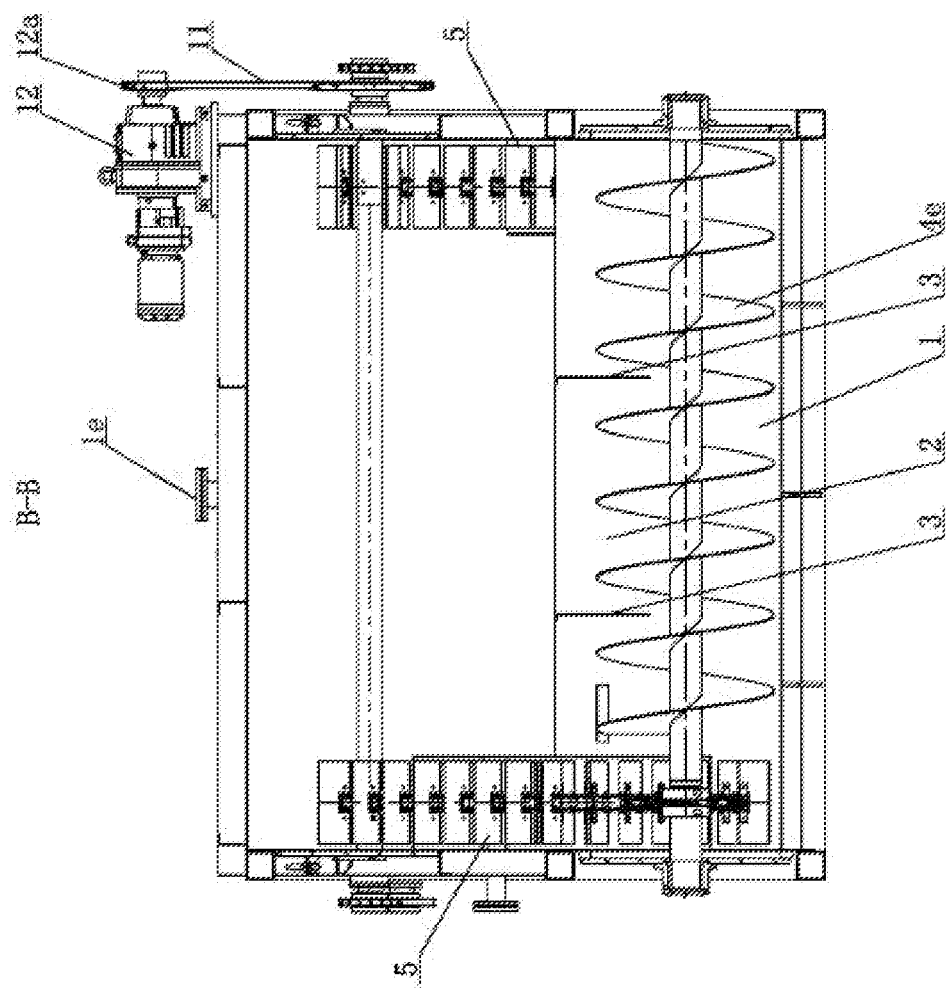
FIG. 3 is a cross-sectional view along B-B in FIG. 1.
Figure 4:
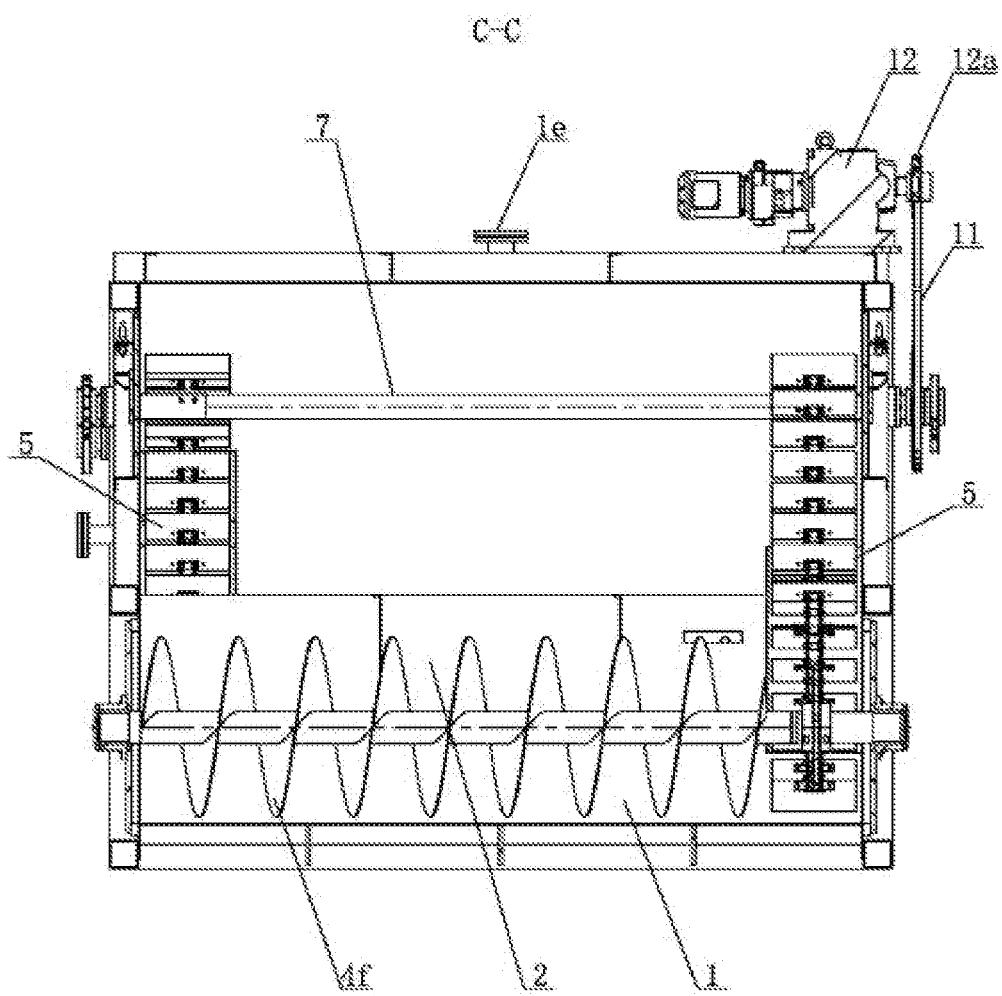
FIG. 4 is a cross-sectional view along C-C in FIG. 1.
Figure 5:
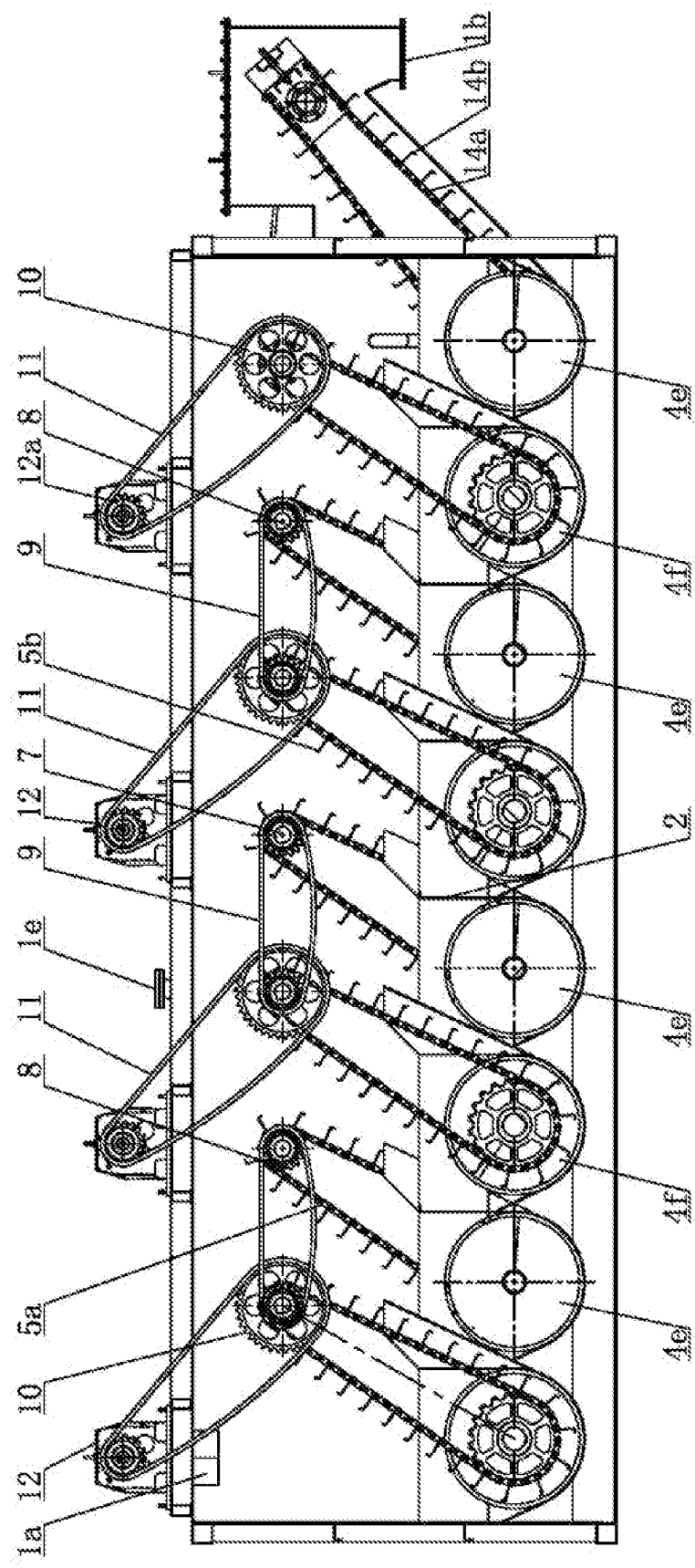
FIG. 5 is a schematic diagram of FIG. 1 with the front wall panel removed.
Figure 6:
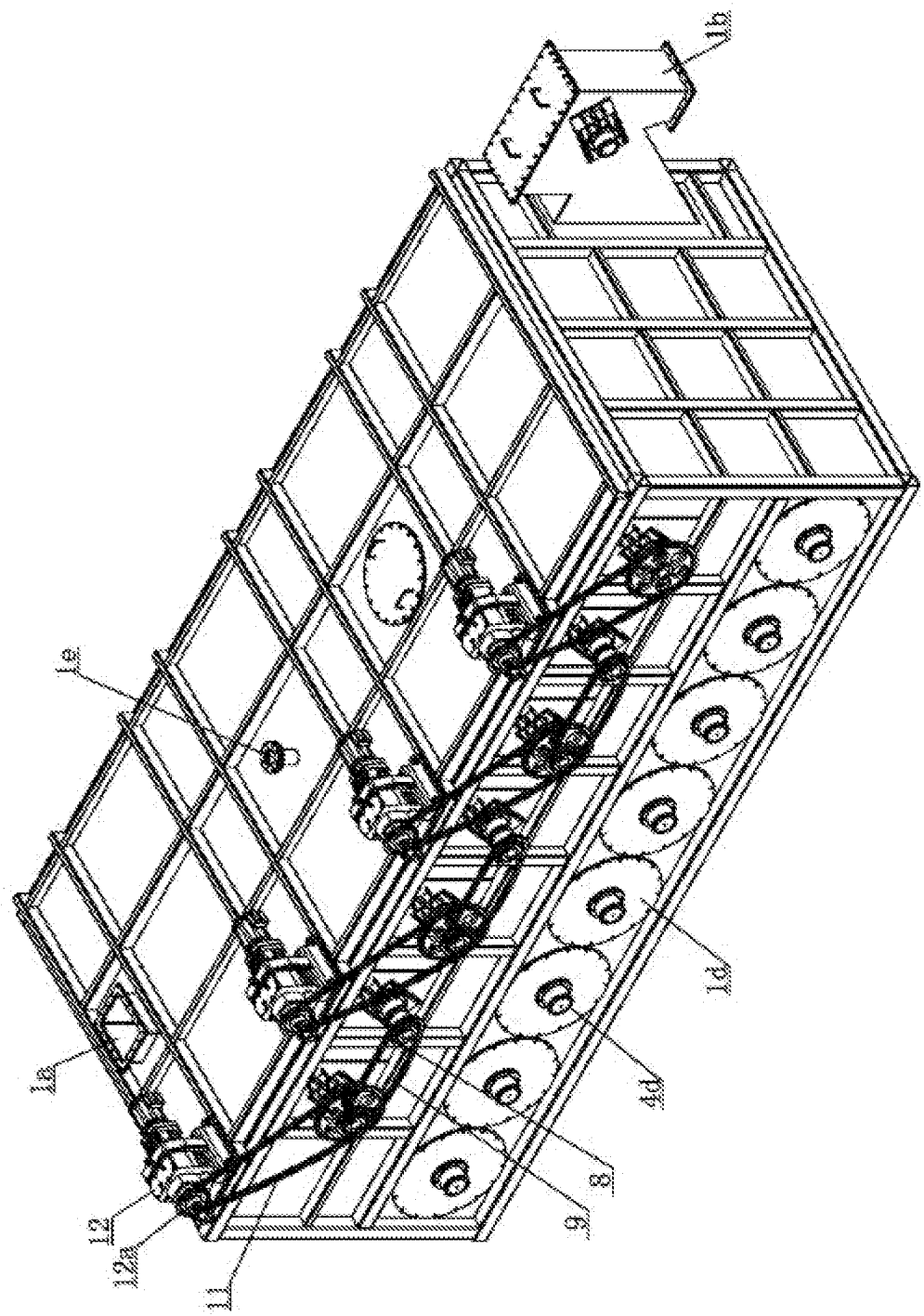
FIG. 6 is a perspective view of FIG. 1.

In the drawings: 1. the immersion tank; 1a. the feed inlet; 1a1. a feed guide tube; 1b. the feed outlet; 1c. the spiral mounting hole; 1d. the circular sealing plate; 1e. an exhausting hole; 2. the tank partition; 2a. the overflowing ports; 2b. a material guide groove; 2c. a discharge groove; 3. the baffle plate; 3a. the concave arc of the baffle plate; 4. the immersion tank spiral; 4a. the spiral shaft; 4b. a main spiral piece; 4c. a hollow large sprocket; 4d. the spiral bearing seat; 4e. the right pushing spiral; 4f. the left pushing spiral; 5. a scraper lifting mechanism; 5a. the lifting drive chain; 5b. lifting scrapers; 6. the small lifting sprocket; 7. the driving shafts; 8. a linked sprocket; 9. a linked chain; 10. a big lifting sprocket; 11. the main chain; 12. the drive reducer; 12a. the main sprocket; 13. filter cartridge; 13a. grate bars; 13b. a filter cartridge outer spiral belt; 13c. a filter cartridge inner spiral belt; 14. a scraper discharging mechanism; 14a. the discharging drive chain; 14b. the discharging scraper; 15. the new dissolving inlet; 16. the concentrated liquid outlet.

DETAILED DESCRIPTION OF THE ILLUSTRATED EMBODIMENT

In the following description of the present invention, the terms of the indicating orientation or positional relationship, such as "upper", "lower", "front", "rear", "left", "right", "inner", "outer", etc. are the orientation or positional relationship based on the drawings. These terms are only for the convenience of describing the present invention and simplifying the description, these terms does not mean that the device must have a specific orientation.

Referring to FIG. 1 to FIG. 13, a powder extractor of the present invention includes a rectangular box body, the top of the box body is equipped with an exhausting hole 1e and a manhole. A plurality of parallel tank partitions 2 are connected between the front and rear wall panels of the box body, the internal cavity of the box body is divided into a plurality of immersion tank 1 by each tank partition 2, the upper part of each tank partition 2 is respectively provided with overflowing ports 2a, the overflowing ports 2a on the adjacent tank partitions 2 are staggered in the front and rear directions, and the height of each overflowing port 2a decreases from right to left, and the discharge end of the rightmost immersion tank 1 is connected with a new dissolving inlet 15, the feed end of the leftmost immersion tank 1 is connected with a concentrated liquid outlet 16; the leftmost immersion tank 1 has a feed inlet 1a above the feed end; The discharge end of each tank partition 2 respectively installs a material guide groove 2b for lifting and turning to the right, and a discharge groove 2c is installed on the discharge end of the right wall panel of the box body.

The bottom of each immersion tank 1 is arc-shaped and is equipped with immersion tank spirals 4, and the spiral directions of the adjacent immersion tank 1s are opposite. From the feed inlet 1a of the solid material, the left pushing spiral 4f in the odd-numbered tanks pushes the solid material to the front side wall of the powder extractor; the right pushing spiral 4e in the even-numbered tanks pushes the solid material to the back side wall of the powder extractor. Each of the material guide grooves 2b is respectively installed with a scraper lifting mechanism 5, and the discharge groove 2c is installed with a scraper discharging mechanism 14.

The material enters the feed end of the leftmost immersion tank 1 from the feed inlet 1a, and the new solvent enters the rightmost immersion tank 1. The soaking and extracting process is completed in the immersion tank 1. When the material is pushed to the discharge end of each immersion tank 1, it is picked up along the material guide groove 2b. After leaving the liquid surface, it is drained briefly and falls into the lower-level immersion tank 1 on the right. The advancing direction of the materials in the adjacent immersion tank 1s is opposite, so that the solid materials advance zigzag in an S-shaped. When the solid material enters the final immersion tank 1, it is fully immersed and mixed with the new solution, and then taken out from the discharge end of the rightmost immersion tank 1 along the discharge groove 2c and discharged out of the machine from the feed outlet 1b. The solid material and the solution always maintain the opposite flow, the material with the highest content is in contact with the concentrated solution, and the material with the lower content is in contact with the dilute solution, which can always maintain a good osmotic pressure, which further improves the mass transfer efficiency. The solid material horizontally advances alternately along the immersion tank 1, and after a period of horizontal advancement, it is taken out and dropped into the next vertical immersion tank 1, and it is repeatedly stirred to make the material and solution to be in a turbulent stat without laminar flow, even if the void fraction of the powder is small, the powder can also be fully saturated by the solution. Adjacent overflowing ports 2a are staggered in the front and rear directions, and the solvent also flows zigzag in an S-shaped, and it is opposite to the forward direction of the solid material. The solvent flows through the full length of each immersion tank 1, and then uses the displacement to overflow to the next immersion tank 1 and flow back through the full length of the immersion tank 1, which greatly extends the extraction stroke of the solid material and the solution, and can achieve full extraction, thereby achieving efficient extraction. The concentrated extract that reaches the leftmost immersion tank 1 is discharged from the concentrated liquid outlet 16. The soaking liquid level is slightly higher than the solid phase, the solid-liquid mixing is sufficient, the solvent consumption is low, the concentration of the obtained mixed liquid is high, and the energy consumption of evaporation and separation is low.

The bottom of the immersion tank 1 is arc-shaped and coincides with the immersion tank spiral 4, which can avoid dead space at the bottom of the tank; the immersion tank spiral 4 is responsible for the transportation of solid materials in the immersion tank 1 and completes the process of soaking and extracting. The forced stirring of the spiral blade avoids the defect of insufficient mass transfer between materials and solvents in the simple soaking process. The spiral directions of adjacent immersion tank 1s are opposite to make the materials advance in an S-shape. The scraper lifting mechanism 5 is used to lift, drain, and transport the soaked solid materials for solid-liquid separation and solid phase lifting; the scraper discharging mechanism 14 is used to lift, drain, and discharge the solid materials after extraction. The spiral plus scraper not only plays the role of conveying solid materials, but also strongly stirs the solid materials.

Figure 7:
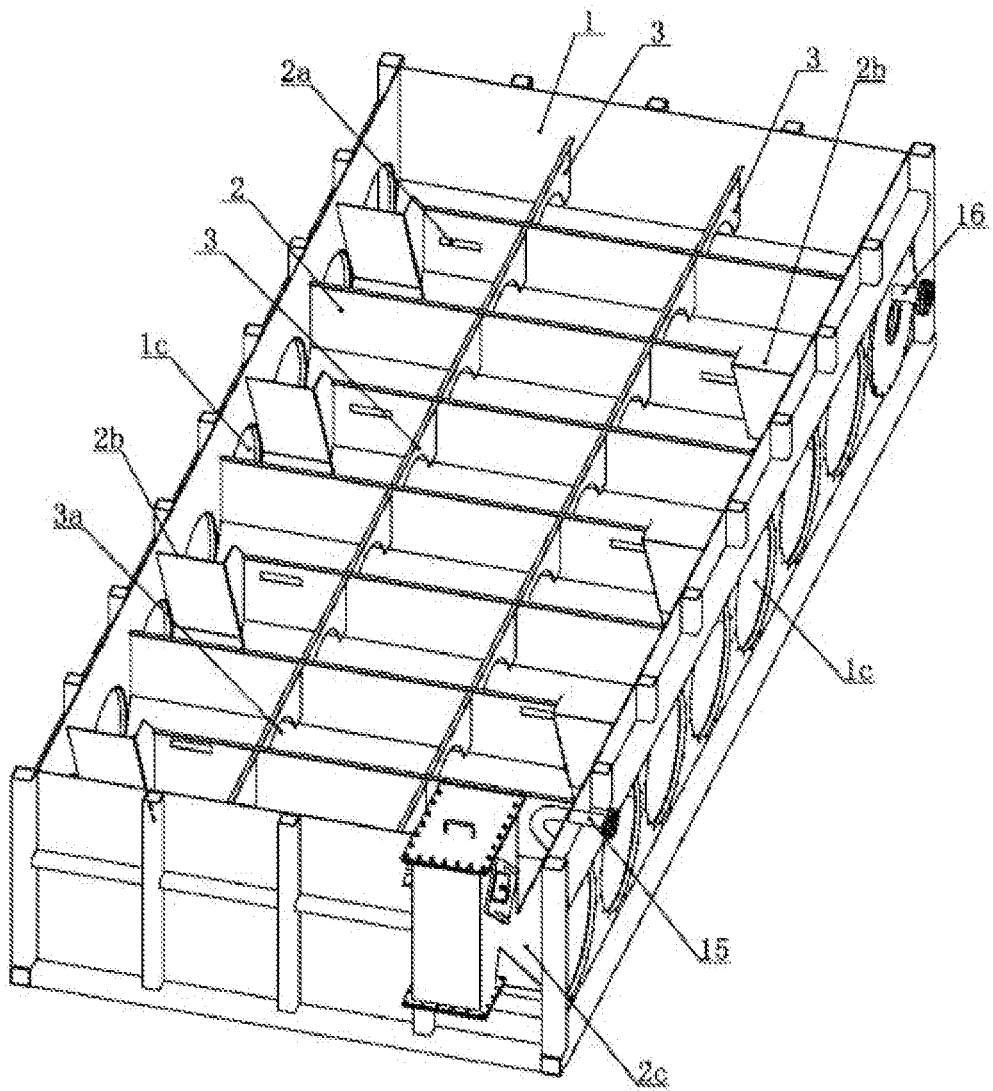
FIG. 7 is a perspective view of the box of the powder extractor with the top cover removed in FIG. 1.

Referring to FIG. 7, each immersion tank 1 is provided with at least one baffle plate 3 extending in the left and right direction, and the lower end of each baffle plate 3 is respectively clamped above the immersion tank spiral 4 through the concave arc of the baffle plate 3a. The baffle plate 3 can prevent the surface solution from not fully contacting with the solid material, that is short-circuiting out. The concave arc of the baffle plate 3a stuck above the immersion tank spiral 4 provides a channel for material transportation, and it forces the solution to pass from the gap of the concave arc of the baffle plate 3a. Stirring and mixing between the solid material and the extracting liquid makes them fully contact, which further improves the infiltration effect of the material and the solution; the solid and the liquid are in turbulent contact under stirring, and the liquid phase has no chromatography, and the concentration of same phase is consistent. The multi-channel baffle plates 3 make the solvent flow in an S-shaped by upward and downward directions in each immersion tank 1, which prevents the short circuit of the solvent, so the extracting power is significantly increased, and the extracting efficiency is high.

Figure 8:
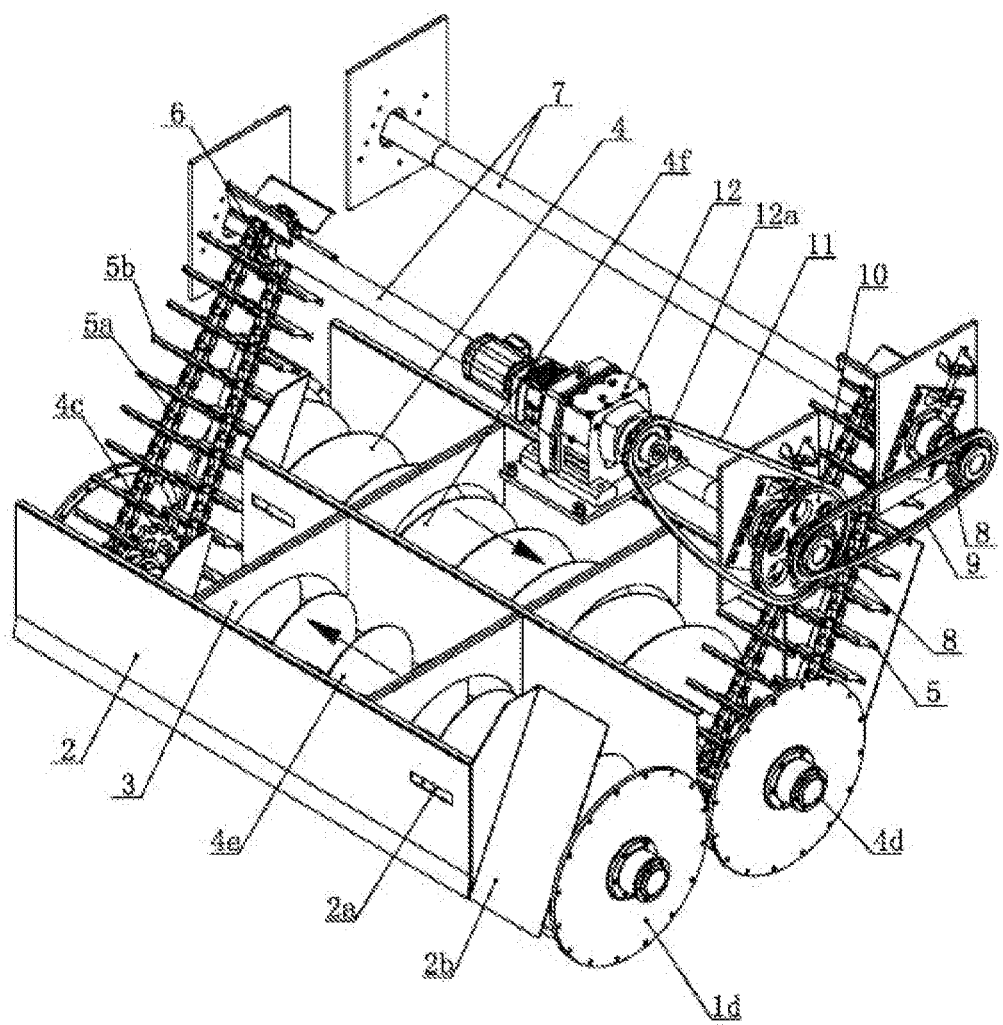
FIG. 8 is a perspective view of two adjacent immersion tanks in FIG. 1.

Referring to FIG. 8, the discharge end of the spiral shaft 4a of each immersion tank spiral 4 is respectively equipped with a hollow large sprocket 4c, the lower end of the lifting drive chain 5a of the corresponding scraper lifting mechanism 5 is engaged with the hollow large sprocket 4c, and a plurality of lifting scrapers 5b are evenly arranged on the lifting drive chain 5a. Part of the material can enter the discharge end of the immersion tank 1 through the hollow of the hollow large sprocket 4c, so that the receiving area of the lifting scraper 5b is enlarged, and the conveying capacity of the lifting scraper 5b is increased. The immersion tank spiral 4 and the scraper lifting mechanism 5 rotate synchronously. The lifting scraper 5b picks up and lifts the pushed material from the solution and then falls into the next immersion tank 1. The conveying capacity of the lifting scraper 5b is greater than that of the immersion tank spiral 4, which can ensure that it does not cause blockage.

The upper end of each lifting drive chain 5a is meshed with the small lifting sprocket 6, each small lifting sprocket 6 is installed on the driving shaft 7, and each driving shaft 7 is also equipped with a linked sprocket 8, two adjacent driving shafts 7 form a group and two linked sprockets 8 are connected by a linked chain 9; the shaft end of one of the driving shafts 7 is equipped with a big lifting sprocket 10, and the big lifting sprocket 10 is connected to the main sprocket 12a of the drive reducer 12 through the main chain 11. The main sprocket 12a of the drive reducer 12 drives the big lifting sprocket 10 to rotate through the main chain 11, the big lifting sprocket 10 drives the small lifting sprocket 6 and the linked sprocket 8 through the driving shaft 7, and the linked chain 9 drives the other driving shaft 7 and the small lifting sprocket to rotate synchronously, two small lifting sprockets 6 drive the lifting scraper 5b to work and drive the immersion tank spiral 4 to rotate through the lifting drive chain 5a respectively, so that a drive reducer 12 can simultaneously drive the two immersion tank spiral 4 to push solid materials to the left and right, and simultaneously drive two scraper lifting mechanisms 5 to synchronously catch, drain and lift solid materials.

The two ends of the spiral shaft 4a of each immersion tank spiral 4 are respectively supported in the spiral bearing seat 4d, and each spiral bearing seat 4d is respectively fixed at the center of the circular sealing plate, and each circular sealing plate 1d covers and fixes on the outside of the spiral mounting holes 1c at both ends of the immersion tank 1. Removing the circular sealing plate 1d and the spiral bearing seat 4d can extract the immersion tank spiral 4 from the spiral mounting hole 1c. When installing, first we can insert the immersion tank spiral 4 to the spiral mounting hole 1c, and then cover the circular sealing plate 1d and fix it with bolts, finally install the spiral bearing seat 4d and fix it.

The lower end of the discharging drive chain 14a of the scraper discharging mechanism 14 is engaged with the hollow large sprocket 4c, and a plurality of discharging scrapers 14b are evenly arranged on the discharging drive chain 14a. Part of the material can enter the discharge end of the right-most immersion tank 1 through the hollow part of the hollow large sprocket 4c, which increases the receiving area of the discharging scraper 14b and improves the conveying capacity of the discharging scraper 14b. The immersion tank spiral 4 and the scraper discharging mechanism 14 rotate synchronously. The discharging scraper 14b picks up the pushed material from the solution, lifts it and discharges it out of the powder extractor. The conveying capacity of the discharging scraper 14b is greater than that of the immersion tank spiral 4 to ensure that it does not cause blockage.

Figure 9:
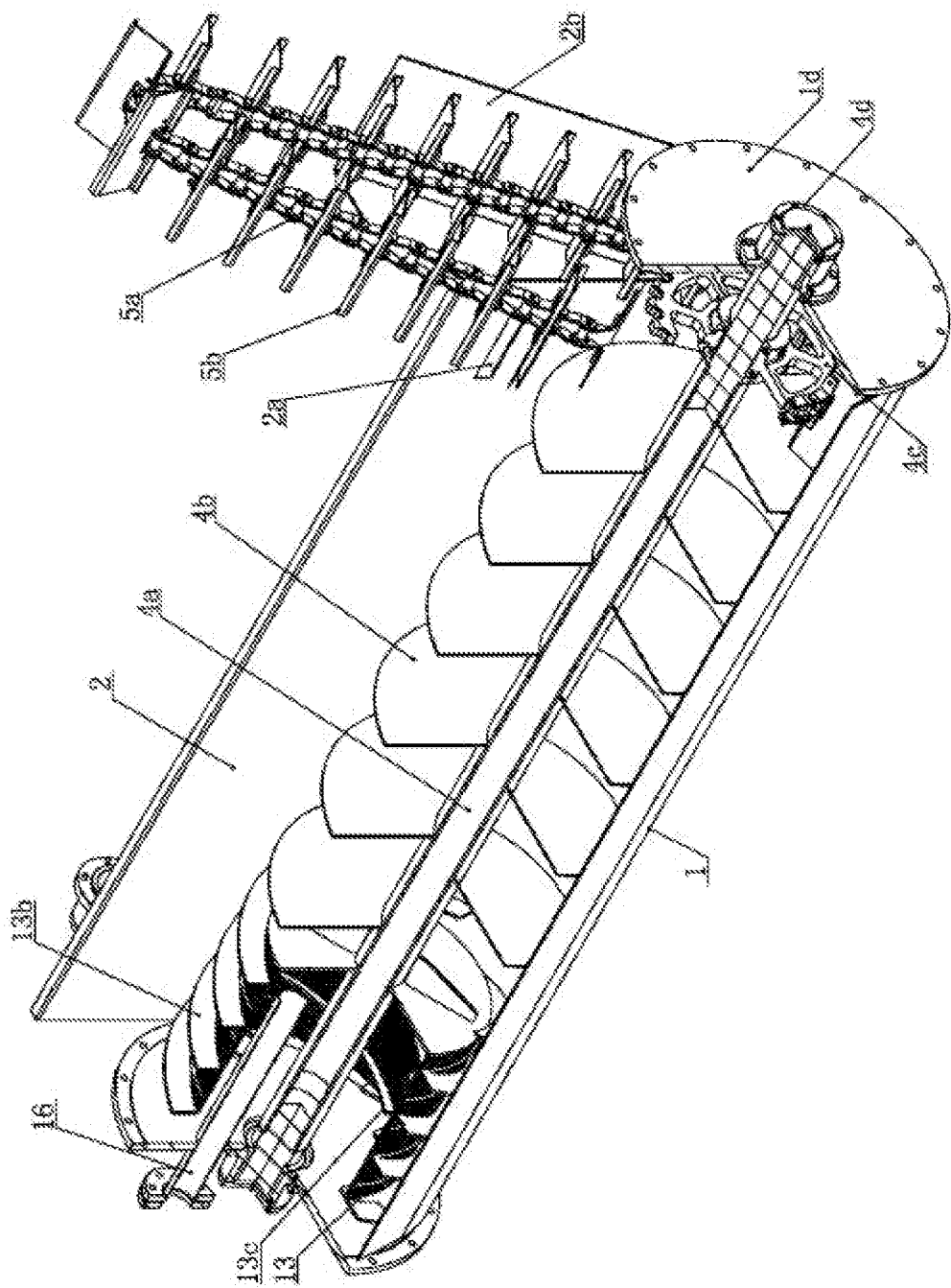
FIG. 9 is a perspective view of the leftmost immersion tank in FIG. 1.
Figure 10:
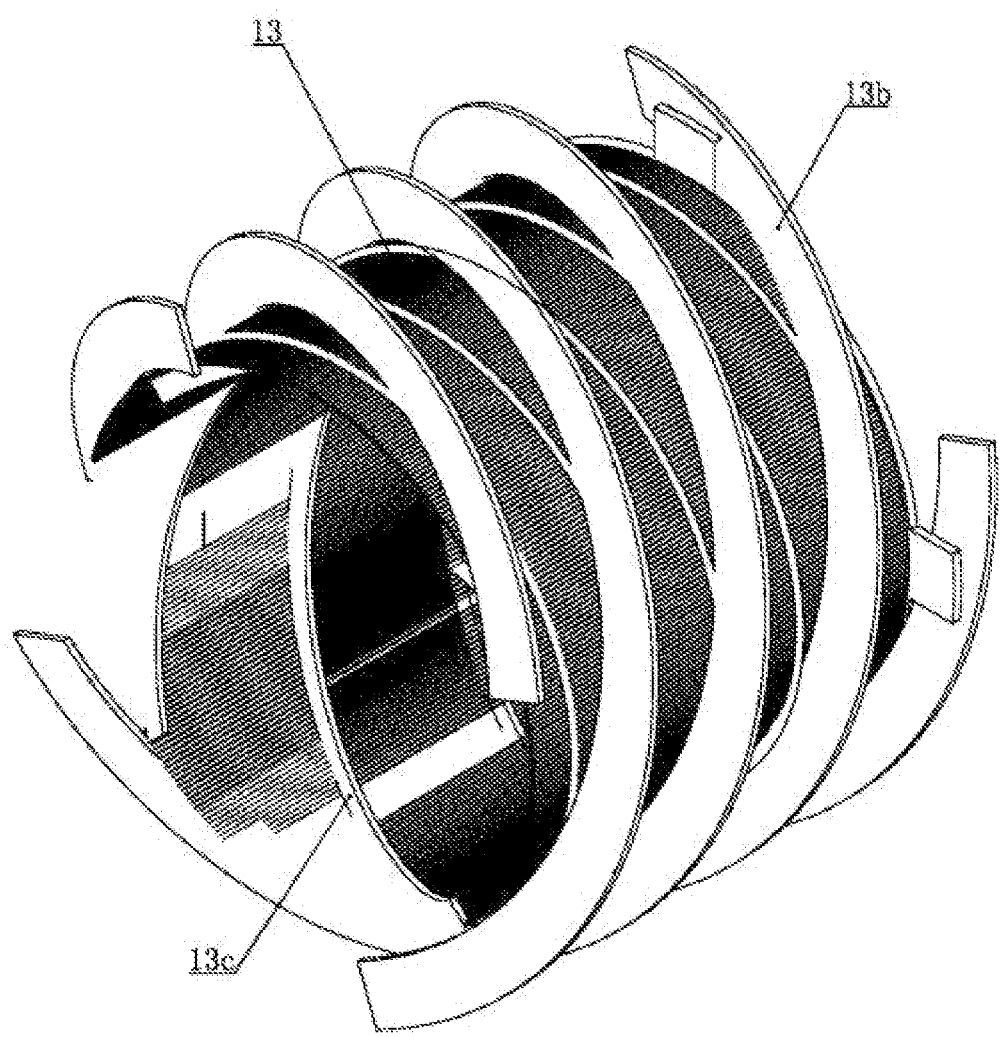
FIG. 10 is a perspective view of the filter cartridge in FIG. 9.
Figure 11:
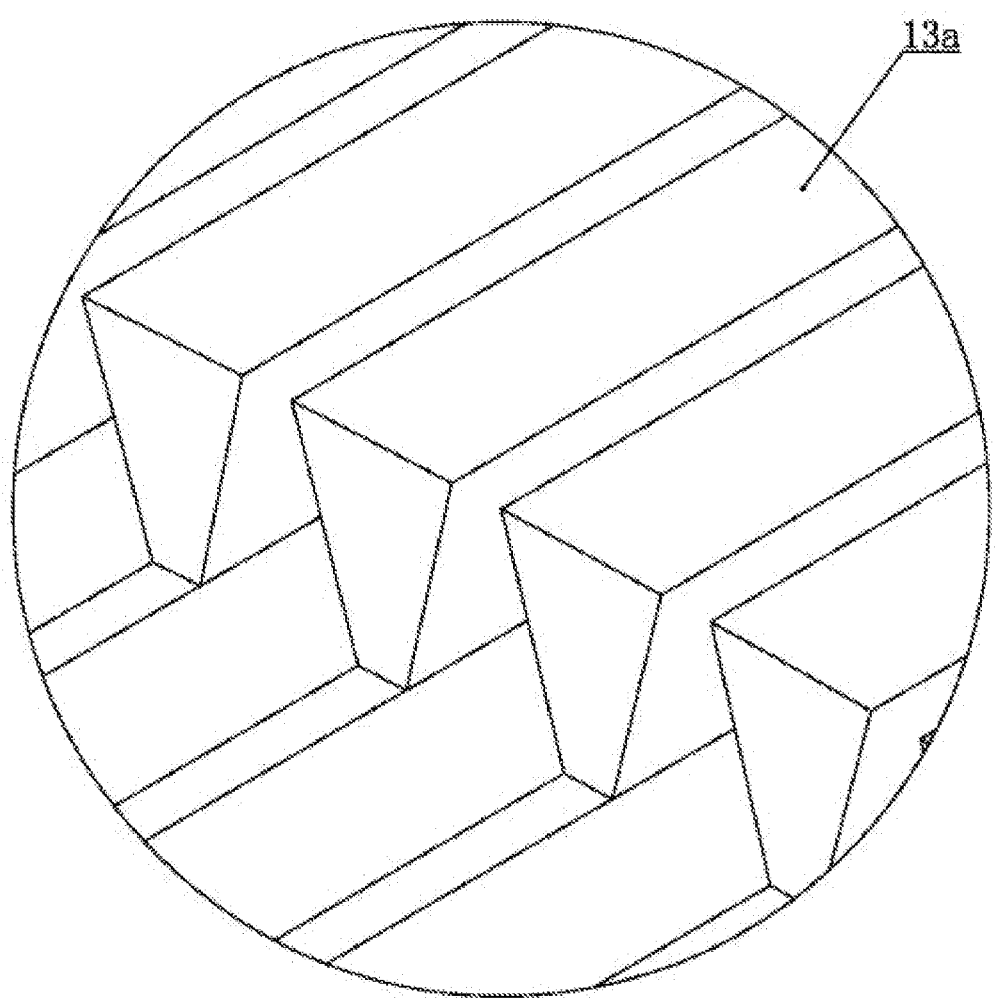
FIG. 11 is a partial enlarged view of the filter cartridge.

Referring to FIGS. 9 to 11, Each immersion tank spiral 4 includes a spiral shaft 4a and a main spiral piece 4b wound around the outer circumference of the spiral shaft 4a, a filter cartridge 13 is installed at the feed end of the spiral shaft 4a below the feed inlet, the port on the side of the filter cartridge 13 facing the main spiral piece 4b is closed and the port on the other one side of it is open, the concentrated liquid outlet 16 is inserted into the internal cavity of the filter cartridge 13, a plurality of grate bars 13a extending in the axial direction are evenly distributed on the circumference of the filter cartridge 13, and the gap between adjacent grate bars 13a is narrow outside and wide inside. Filtered by the filter cartridge 13 before flowing out, the powder is trapped on the outer surface of the filter cartridge 13 to reduce the content of powdery solids in the concentrated extract as much as possible to provide guarantee for the subsequent the spiral-liquid separation and evaporation; after the concentrated extract of the solid-liquid intermixed medium is continuously and stably filtered out, it enters the concentrated liquid outlet 16 and flows out. The filtered concentrated extract can be stably and continuously filtered and transported without blocking the outlet pipe valve to enter the spiral-liquid separation system for fine filtration. Once the powder passes over the outermost gap of the filter cartridge 13, it can smoothly fall into the bottom of the filter cartridge 13 and be pushed out by the filter cartridge 13 inner spiral belt 13c to clean, which avoids powder particles from getting stuck in the gap between adjacent grate bars 13a and affecting the filtering capacity.

The outer circumference of the filter cartridge 13 is wrapped with a filter cartridge 13 outer spiral belt 13b, and the rotating direction of the filter cartridge 13 outer spiral belt 13b is the same as the coaxial main spiral piece 4b. The filter cartridge 13 outer spiral belt 13b can push the solid materials flowing with the liquid to the side of the main spiral piece 4b, avoiding excessive material accumulation outside the filter cartridge 13.

The inner wall of the filter cartridge 13 is provided with a filter cartridge 13 inner spiral belt 13c, and the rotating direction of the filter cartridge 13 inner spiral belt 13c is opposite to the coaxial main spiral piece 4b. A small amount of solid powder will enter the filter cartridge 13 with the extracted liquid and settle on bottom of the inner wall of the filter cartridge 13. The filter cartridge 13 inner spiral belt 13c pushes the sediment out of the filter cartridge 13 from the open end, and then the sediment is pushed out the filtering section by the filter cartridge 13 outer spiral belt 13b to complete the self-cleaning process of the filter cartridge 13. So, realizing stable, reliable, and continuous filtration, improving the craft of the powder extractor, that solves the problem of separation of high-powder material and liquid, and makes the powder extractor have a wide range of adaptability to various oils.

Referring to FIGS. 1 to 6, the feed inlet 1a can be arranged at the left part of the top of the box body, and a feed guide tube 1a1 is connected below the feed inlet 1a to guide the new solid material to flow to the front side of the filter cartridge 13.

Figure 12:
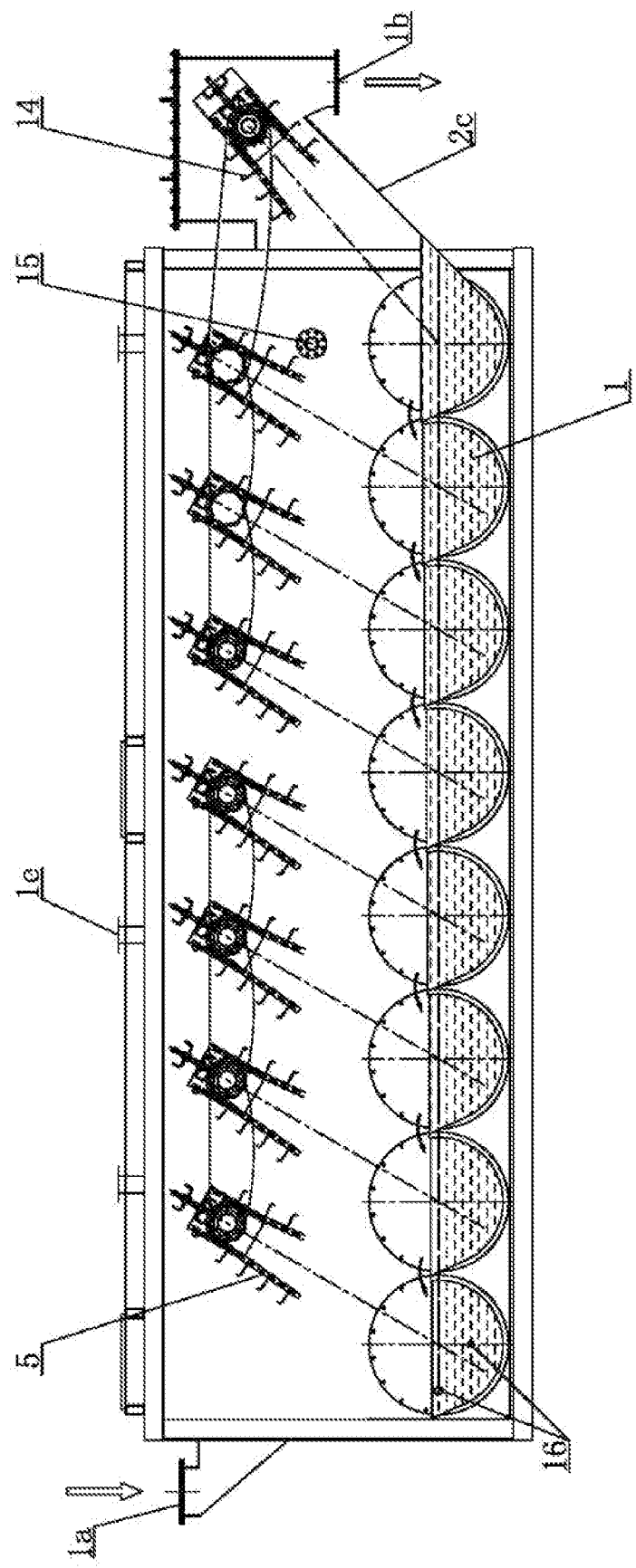
FIG. 12 is a schematic diagram of the working state of the second embodiment of the powder extractor of the present invention.
Figure 13:
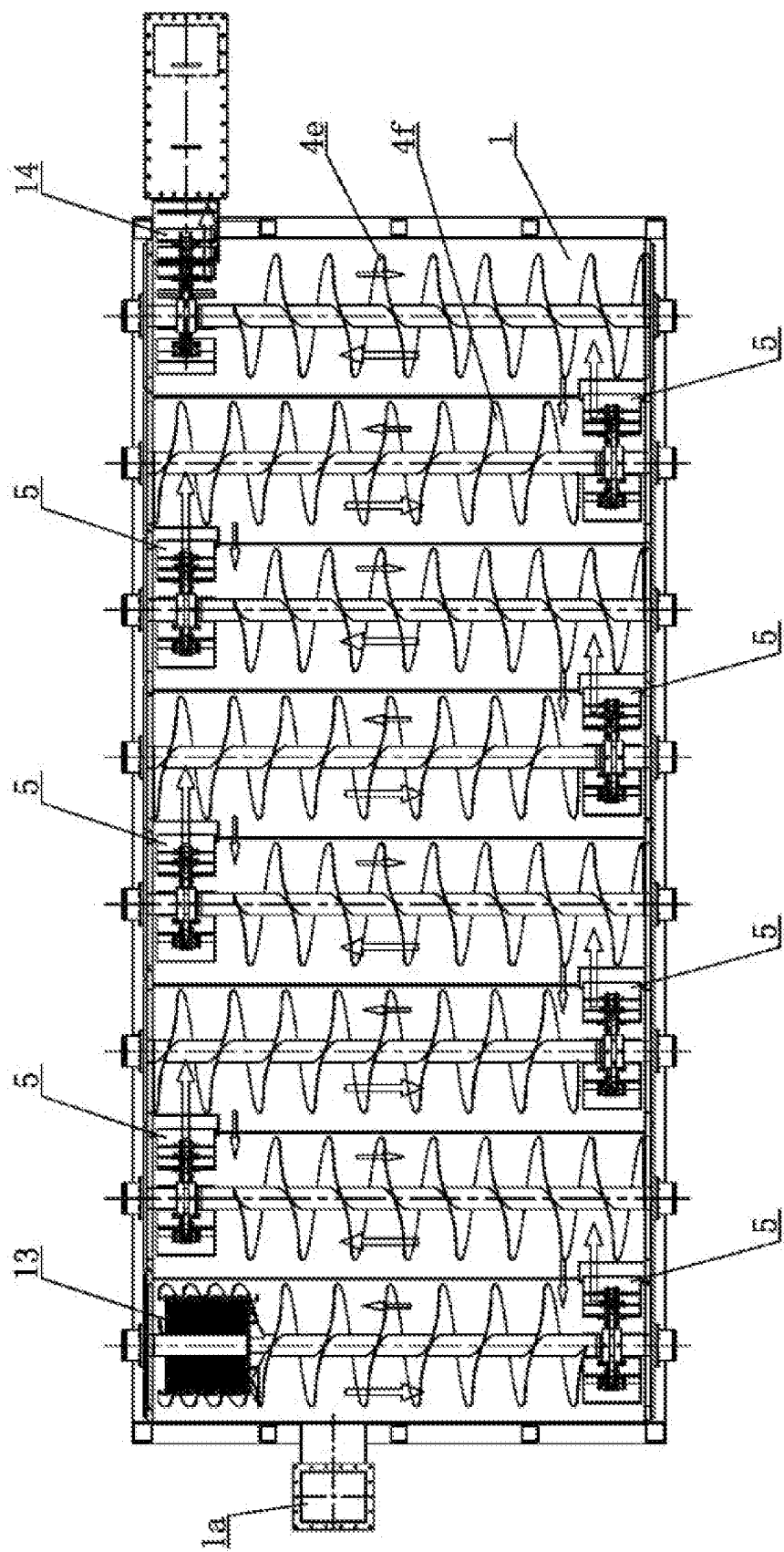
FIG. 13 is a top view of FIG. 12.

Referring to FIGS. 12 and 13, the feed inlet 1a also can be arranged at the top of the box body's left side wall, and the position in the front-rear direction is also located in front of the filter cartridge 13. The immersion tank 1 on the far right has the highest liquid level and the liquid level of the immersion tank 1 overflows to the left one by one. The big arrow in FIG. 13 is the direction of the solid material, and the small arrow is the flowing direction of the solution, which flows in the reverse direction.

The invention adopts "one-pot stew" leaching, which is efficient and reliable, and can be used for leaching powdery materials and high-powder materials. The invention can solve the bottleneck in the preparation of soybean concentrated protein and cottonseed concentrated protein, overcome the problems of poor material permeability, easy dissolution of protein and sugar and blocking grid plates, shallow leaching material layer, large equipment investment, low production efficiency, and high failure rate of system. For powdery waste material that cannot be processed in the traditional extracting process, such as white bean flakes of high-powder soybean, semi-denatured puffed powder, the powder extractor of the present invention can be used to extract these materials to produce concentrated protein. It can greatly enhance the economic value of these materials and enhance the economic efficiency and market competitiveness of enterprises.

The powder extractor is used for oily materials such as fish meal, rice bran, rapeseed cake and tea seed cake, which can improve its utilization and economic value; it can be used for leaching of pressed palm kernel cake. When the thickness of the rolled embryo is suitable, palm kernel can be leached directly. The powder extractor can be easy to use and save investment in equipment. The powder extractor can be widely used in the processing of most oil or oily materials to achieve "universal" extraction.

The foregoing descriptions are only preferred and feasible embodiments of the present invention, and therefore do not limit the scope of patent's protection of the present invention. In addition to the above-mentioned embodiments, the present invention can also have other embodiments. All technical solutions formed by equivalent replacements or equivalent transformations fall within the protecting scope of the present invention. The undescribed technical features of the present invention can be implemented by using existing technology and will not be repeated here.

What is claimed is:

1. A powder extractor, including a rectangular box body, characterized in that, a plurality of parallel tank partitions are connected between the front and rear wall panels of the box body, the internal cavity of the box body is divided into a plurality of immersion tanks aligned in one row by the plurality of tank partitions, the upper part of each tank partition is respectively provided with overflowing ports, the overflowing ports on the adjacent tank partitions are staggered in the front and rear directions, the end of the rightmost immersion tank is a discharge end, the end of the leftmost immersion tank is a feed end, and the height of each overflowing port decreases from right to left, and the discharge end of the rightmost immersion tank is connected with a new dissolving inlet, the feed end of the leftmost immersion tank is connected with a concentrated liquid outlet; the leftmost immersion tank has a feed inlet above the feed end; the discharge end of each tank partition respectively installs a material guide groove for lifting and turning to the right, and a discharge groove is installed on the discharge end of the right wall panel of the box body.

2. The powder extractor as claimed in claim 1, wherein the bottom of each immersion tank is arc-shaped and is equipped with immersion tank spirals, and the spiral directions of the adjacent immersion tanks are opposite; each of the material guide grooves is respectively installed with a scraper lifting mechanism, and the discharge groove is installed with a scraper discharging mechanism.

3. The powder extractor as claimed in claim 2, wherein each immersion tank is provided with at least one baffle plate extending in the left and right direction, and the lower end of each baffle plate is respectively clamped above the immersion tank spiral through the concave arc of the baffle plate.

4. The powder extractor as claimed in claim 2, wherein the discharge end of the spiral shaft of each immersion tank spiral is respectively equipped with a hollow large sprocket, the scraper lifting mechanism of each of the material guide grooves comprises a lifting drive chain and a plurality of lifting scrapers evenly arranged on the lifting drive chain, the lower end of the lifting drive chain of the corresponding scraper lifting mechanism is engaged with the hollow large sprocket.

5. The powder extractor as claimed in claim 4, further comprising a main chain, wherein the upper end of each lifting drive chain is meshed with the small lifting sprocket, each small lifting sprocket is installed on the driving shaft, and each driving shaft is also equipped with a linkage sprocket, two adjacent driving shafts form a group and two linkage sprockets are connected by a linked chain; the shaft end of one of the driving shafts is equipped with a big lifting sprocket, and the big lifting sprocket is connected to the main sprocket of the drive reducer through the main chain.

6. The powder extractor as claimed in claim 2, wherein the two ends of the spiral shaft of each immersion tank spiral are respectively supported in the spiral bearing seat, and each spiral bearing seat is respectively fixed at the center of the circular sealing plate, and each circular sealing plate covers and fixes on the outside of the spiral mounting holes at both ends of the immersion tank.

7. The powder extractor as claimed in claim 4, wherein the scraper discharging mechanism comprises a discharging drive chain and a plurality of discharging scrapers are evenly arranged on the discharging drive chain, the lower end of the discharging drive chain of the scraper discharging mechanism is engaged with the hollow large sprocket.

8. The powder extractor as claimed in claim 2, wherein each immersion tank spiral includes a spiral shaft and a main spiral piece wound around the outer circumference of the spiral shaft, a filter cartridge is installed at the feed end of the spiral shaft below the feed inlet, the port on the side of the filter cartridge facing the main spiral piece is closed and the port on the other one side of it is open, the concentrated liquid outlet is inserted into the internal cavity of the filter cartridge, a plurality of grate bars extending in the axial direction are evenly distributed on the circumference of the filter cartridge, and the gap between adjacent grate bars is narrow outside and wide inside.

9. The powder extractor as claimed in claim 8, wherein the outer circumference of the filter cartridge is wrapped with a filter cartridge outer spiral belt, and the filter cartridge outer spiral belt rotates in the same direction as the main spiral piece on the same spiral shaft.

10. The powder extractor as claimed in claim 9, wherein the inner wall of the filter cartridge is provided with a filter cartridge inner spiral belt, and the filter cartridge inner spiral belt rotates in the opposite direction to the main spiral piece on the same spiral shaft.

* * * * *